UNITED STATES PATENT OFFICE.

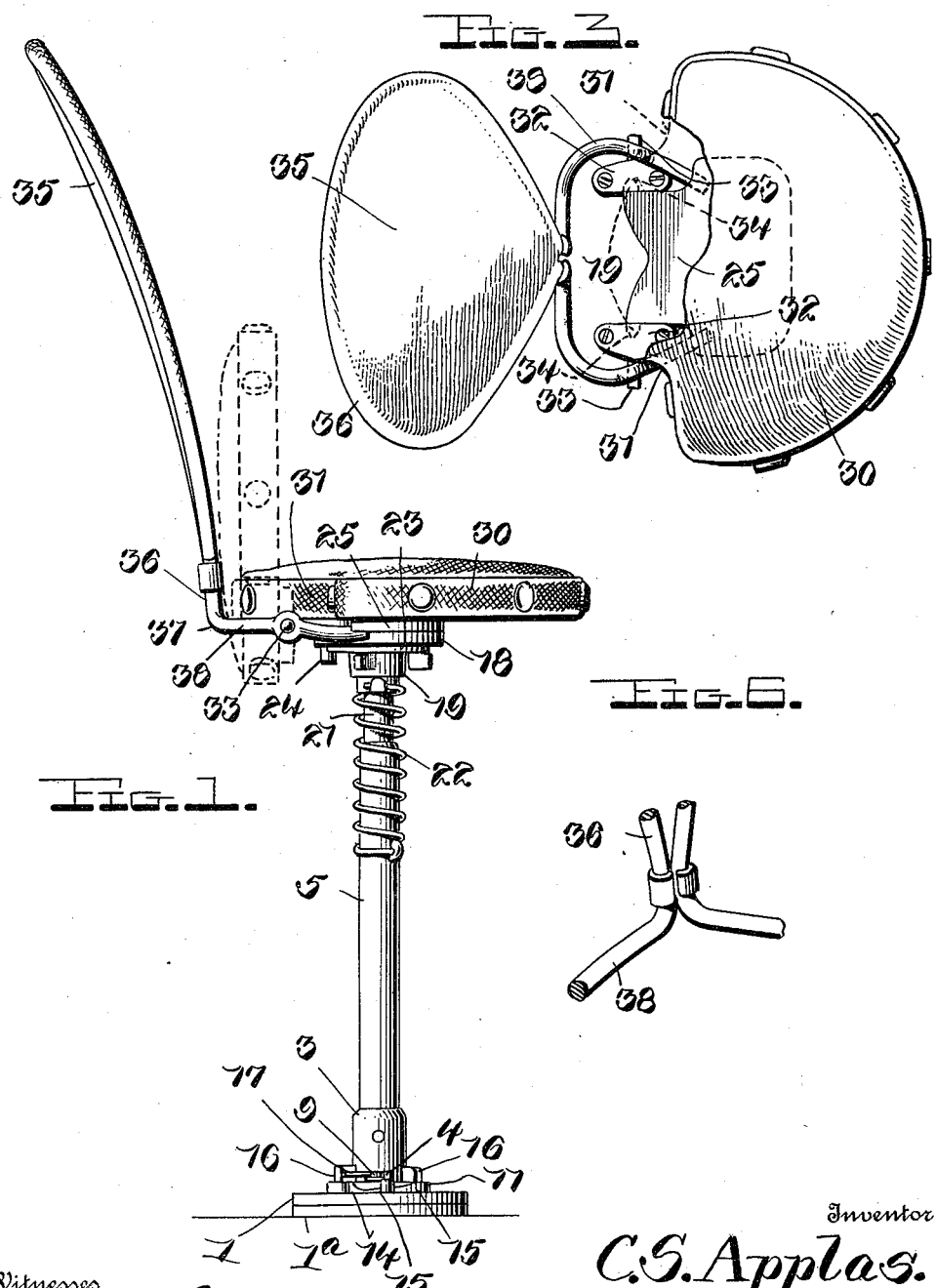

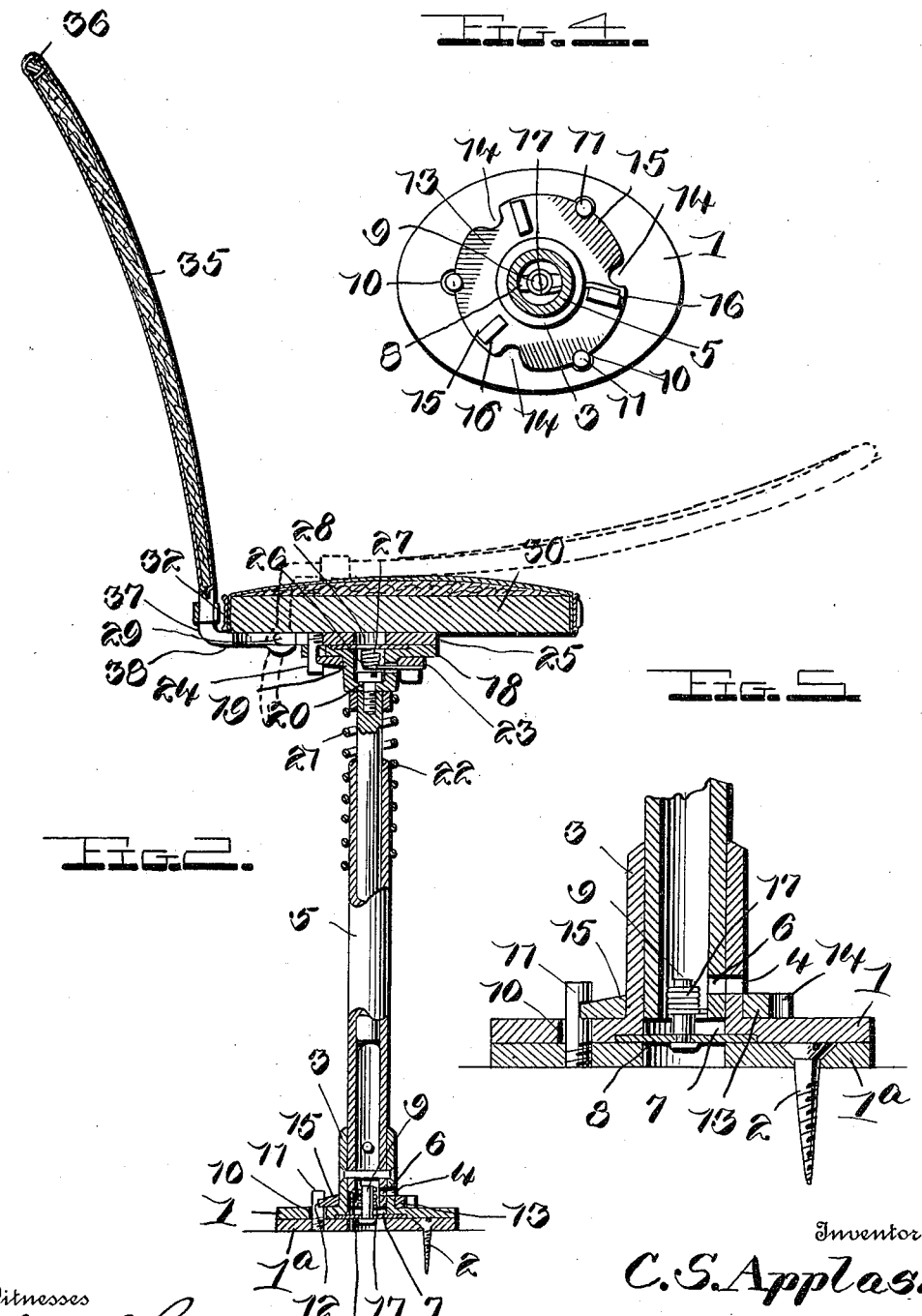

CLARENCE S. APPLAS, OF MOLINE, ILLINOIS.

AUXILIARY VEHICLE-SEAT.

1,013,265.  Specification of Letters Patent.  Patented Jan. 2, 1912.

Application filed October 26, 1910. Serial No. 589,170.

*To all whom it may concern:*

Be it known that I, CLARENCE S. APPLAS, a citizen of the United States, residing at Moline, in the county of Rock Island and State of Illinois, have invented certain new and useful Improvements in Auxiliary Vehicle-Seats, of which the following is a specification, reference being had to the accompanying drawings.

This invention is an improved auxiliary seat for use on automobiles, and other vehicles, and consists in the construction, combination and arrangement of devices hereinafter described and claimed.

One object of my invention is to provide an improved auxiliary seat which may be readily attached to or removed from an automobile or other vehicle.

A further object is to effect improvements in the construction of supporting means for the auxiliary seat whereby the same is provided with a supporting spring.

A further object is to provide improved means for securing the standard on the floor of the automobile or other vehicle, and for securing the seat on the upper end of the standard.

A further object is to effect improvements in the construction, of the seat, and its supporting bracket whereby the seat is adapted to be either disposed over the supporting bracket or turned upwardly therefrom, to one side thereof.

A further object of the invention is to effect improvements in the construction of the supporting bracket, the seat and the back, whereby the seat and the back are independently pivotally mounted for angular movement in a vertical plane.

In the accompanying drawings—Figure 1 is a side elevation of an auxiliary seat constructed in accordance with my invention, showing the bottom of the seat, and the back in normal position in full lines, and showing the seat in upturned position in dotted lines. Fig. 2 is a vertical sectional view of the same showing the seat in lowered position in full lines, the back in upright position in full lines, and turned down upon the seat in dotted lines. Fig. 3 is a plan with parts of the bottom of the seat removed so as to disclose subjacent construction. Fig. 4 is a horizontal section on the plane indicated by the line *a—a* of Fig. 1, and showing the base of the standard in plan. Fig. 5 is a detail sectional view of the lower portion of the standard, and Fig. 6 is a detail perspective view of a portion of the frame of the back.

In accordance with my invention I provide a plate 1 which may be secured on a base plate 1ª on the floor of an automobile or other vehicle, at any suitable point as slightly in advance of one of the seats thereof by means of screws 2. The said plate has a tubular sleeve 3 which rises therefrom and is provided at one side at a point above the base plate with a segmental slot 4. The standard 5 of the auxiliary seat is tubular and its lower end is secured in the said sleeve 3, and is provided at one side with a slot 6 which coincides with the slot 4. The base plate has a central opening 7 across which extends the bar 8 which is disposed in grooves in the under side of the base plate and is provided with a pin 9 which projects upwardly therefrom, and is disposed centrally of the standard and in the lower end thereof. Said plate 1 has openings 10 at suitable points which receive studs 11 that project from the upper side of the base plate 1, the said studs being provided on their inner sides with notches 12. A locking collar 13 bears on the plate 1 and is free to turn on the lower portion of the sleeve 3. Said locking collar is provided with peripheral recesses 14 to clear the studs 11, and the segments 15 thereof between the said recesses have their upper sides beveled or inclined to form wedge shaped cams which by engagement with the notches 12 of the studs 11, when the said collar 13 is turned in one direction, cause the said collar to coact with the said studs and detachably lock or secure the plate 1 with its standard on the base plate 1ª.

The locking collar has lugs or wings 16 which project from the upper side thereof, and which may be grasped in order to turn the said collar to cause it to lock or unlock the plate 1, and on the pin 9 is a spring 17, one end or arm of which extends through and operates in the slots 4, 6, of the sleeve 3 and standard 5, respectively, and by engaging one of the said lugs or wings, normally moves the said collar to locking position with its wedge shaped cams in engagement with the notches 3 of the studs and maintain the said locking collar normally in locking position.

A plate or disk 18 which is substantially identical in construction with the plate 1 has the sleeve 19 which depends from its lower side, swivelly mounted as at 20 on the upper end of a member 21, which is telescopically disposed in the tubular standard 5, and movable vertically therein. A coiled extensile spring 22 has its lower portion disposed on the upper portion of the standard 5 and its upper end connected to the sleeve 19, the said spring serving to support the seat and forming a cushion therefor in connection with the telescopically related members of the seat supporting standard.

A locking collar 23 which is substantially identical in construction with the locking collar 13 is mounted on the sleeve 19 of the disk or plate 18 and serves to engage notches in lugs 24 which depend from a bracket plate 25, the said lugs fitting in openings with which the said disk or plate 18 is provided, and having recesses or notches for engagement by the cam segments of the said locking collar 23. Said collar is normally held in locking position by means of a spring 26, which is substantially identical in construction with the spring 14, and is mounted on a pin 27 which is connected to the disk 18 by a bar 28 and is disposed in the upper portion of the tubular member 21 of the standard.

The bracket plate 25 is provided at its rear corners with outwardly projecting alining studs 29. The seat 30 which is substantially circular in form with recesses 31 in opposite sides of the rear portion thereof, is provided on its under side with hinge members 32 each of which is provided on its inner side with a pivotal recess 34 for the reception of one of the pivot studs 29. Hence the seat is pivotally mounted on the bracket plate 25, so that it may be turned horizontally thereon, or turned upwardly therefrom. The back 35 has a frame 36 forming the border thereof, and in practice is made from a single rod of metal bent in the required shape, the ends of the said rod at the lower side of the back being bent outwardly as at 37, and extended forwardly and inwardly as at 38 to form arms which are pivotally mounted on the studs 33 of the hinge members 32. Hence the back is pivotally connected to the seat, may be upturned therefrom, or may be turned downwardly upon the same, and when the back is upturned, and in normal position for use, the ends of its arms 38 bear against the under side of the bracket plate 25.

It will be understood from the foregoing that the seat and the back are pivotally connected to the bracket plate so that each may be turned angularly in a vertical plane independently of the other. When the back is in upright position, the seat may be turned upwardly against the same, so as to provide space in advance of the seat, and when the seat is downturned, and in normal position for use, the back may be turned down and folded upon the same. Owing to the swiveled connection between the plate or disk 18 and the upper member of the standard, the seat which is detachably connected to the said plate or disk by the means hereinbefore described, may be swung or turned in any desired direction in a horizontal plane.

My improved auxiliary seat takes up but very little room, may be readily disposed in position in an automobile or other vehicle, and may be as readily removed therefrom, when it is not desired to use the same. Moreover, owing to the fact that the seat is detachably connected to the standard, when the seat is not in use, it, together with the standard may be conveniently packed in a very small space so that my improved auxiliary seat is extremely portable and may be readily disposed out of the way when it is not desired to use the same.

While I have herein shown and described what I now regard as the preferred embodiment of my invention, I would have it understood that modifications may be made in the form, proportion and minor construction of the various parts without departing from the spirit of my invention, and within the scope of the appended claim.

I claim:—

The combination of a standard, a bracket mounted on the upper end of the standard for revolution thereon, a seat having rearwardly extending hinge members on its underside pivotally connected to said bracket, the pivotal axis of the seat being at right angles to that of the bracket so that the seat may be upturned from or turned down upon the bracket, and a back having a portion near its lower end bent at substantially right angles thereto, the bent portion of the back extending under the seat and being provided with arms which are pivotally connected to the hinge members of the seat so that the back may be turned upwardly or downwardly, the said arms projecting forwardly beyond the pivotal axis of the back to bear against the under side of the bracket and support the back in upturned position.

In testimony whereof I hereunto affix my signature in the presence of two witnesses.

CLARENCE S. APPLAS.

Witnesses:
 WALTER APPLAS,
 ALBERT ORR.